United States Patent
Yamada et al.

(10) Patent No.: US 9,194,951 B2
(45) Date of Patent: Nov. 24, 2015

(54) VEHICLE OBSTACLE DETECTION DEVICE

(71) Applicant: PANASONIC CORPORATION, Osaka (JP)

(72) Inventors: Seisuke Yamada, Aichi (JP); Masahiro Nakazono, Mie (JP); Hiroki Nishimoto, Mie (JP); Takuma Nakagawa, Mie (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/358,706

(22) PCT Filed: Nov. 16, 2012

(86) PCT No.: PCT/JP2012/079806
§ 371 (c)(1),
(2) Date: May 15, 2014

(87) PCT Pub. No.: WO2013/077268
PCT Pub. Date: May 30, 2013

(65) Prior Publication Data
US 2014/0328142 A1 Nov. 6, 2014

(30) Foreign Application Priority Data
Nov. 21, 2011 (JP) .................. 2011-254464

(51) Int. Cl.
*B60Q 1/00* (2006.01)
*G01S 15/93* (2006.01)
(Continued)

(52) U.S. Cl.
CPC ........... *G01S 15/931* (2013.01); *G01S 7/52004* (2013.01); *G01S 7/526* (2013.01); *G01S 7/5276* (2013.01); *G08G 1/16* (2013.01); *G01S 2015/932* (2013.01); *G01S 2015/938* (2013.01)

(58) Field of Classification Search
CPC ...... G01S 15/931; G01S 7/52004; G08G 1/16
USPC .................. 340/435, 436, 539.23, 686.1, 3.6; 367/93, 99, 95, 909; 701/149, 301, 701/302; 364/461, 424.05, 426.01; 180/169
See application file for complete search history.

(56) References Cited

U.S. PATENT DOCUMENTS 5,067,115 A * 11/1991 Wada .............................. 367/99
5,530,651 A * 6/1996 Uemura et al. ............... 701/301
(Continued)

FOREIGN PATENT DOCUMENTS

| JP | 02-019126 A | 1/1990 |
|---|---|---|
| JP | 05-068668 A | 3/1993 |

(Continued)

OTHER PUBLICATIONS

International Search Report issued in International Application No. PCT/JP2012/079806 with Date of mailing Feb. 19, 2013, with English Translation.

*Primary Examiner* — Toan N Pham
(74) *Attorney, Agent, or Firm* — McDermott Will & Emery LLP

(57) ABSTRACT

A vehicle obstacle detection device includes a sensor that transmits and receives ultrasonic waves, and a controller that instructs the sensor to transmit the ultrasonic waves. The controller compares amplitude of reflected waves received by the sensor with a threshold to determine presence or absence of an obstacle. The controller includes a voltage monitoring unit that detects a power supply voltage. The controller more reduces the threshold as the power supply voltage detected by the voltage monitoring unit is lower.

4 Claims, 5 Drawing Sheets

(51) Int. Cl.
*G01S 7/526* (2006.01)
*G08G 1/16* (2006.01)
*G01S 7/527* (2006.01)
*G01S 7/52* (2006.01)

(56) References Cited

U.S. PATENT DOCUMENTS 8,935,088 B2 * 1/2015 Matsubara .................. 701/301
2011/0022269 A1 1/2011 Nakazono et al.

FOREIGN PATENT DOCUMENTS

| | | |
|---|---|---|
| JP | 05-215850 A | 8/1993 |
| JP | 05-223928 A | 9/1993 |
| JP | 10-048334 A | 2/1998 |
| JP | 11-142426 A | 5/1999 |
| JP | 2005-135274 A | 5/2005 |
| JP | 2006-349581 A | 12/2006 |
| JP | 2008-232859 A | 10/2008 |
| WO | 2009/119577 A1 | 10/2009 |

* cited by examiner

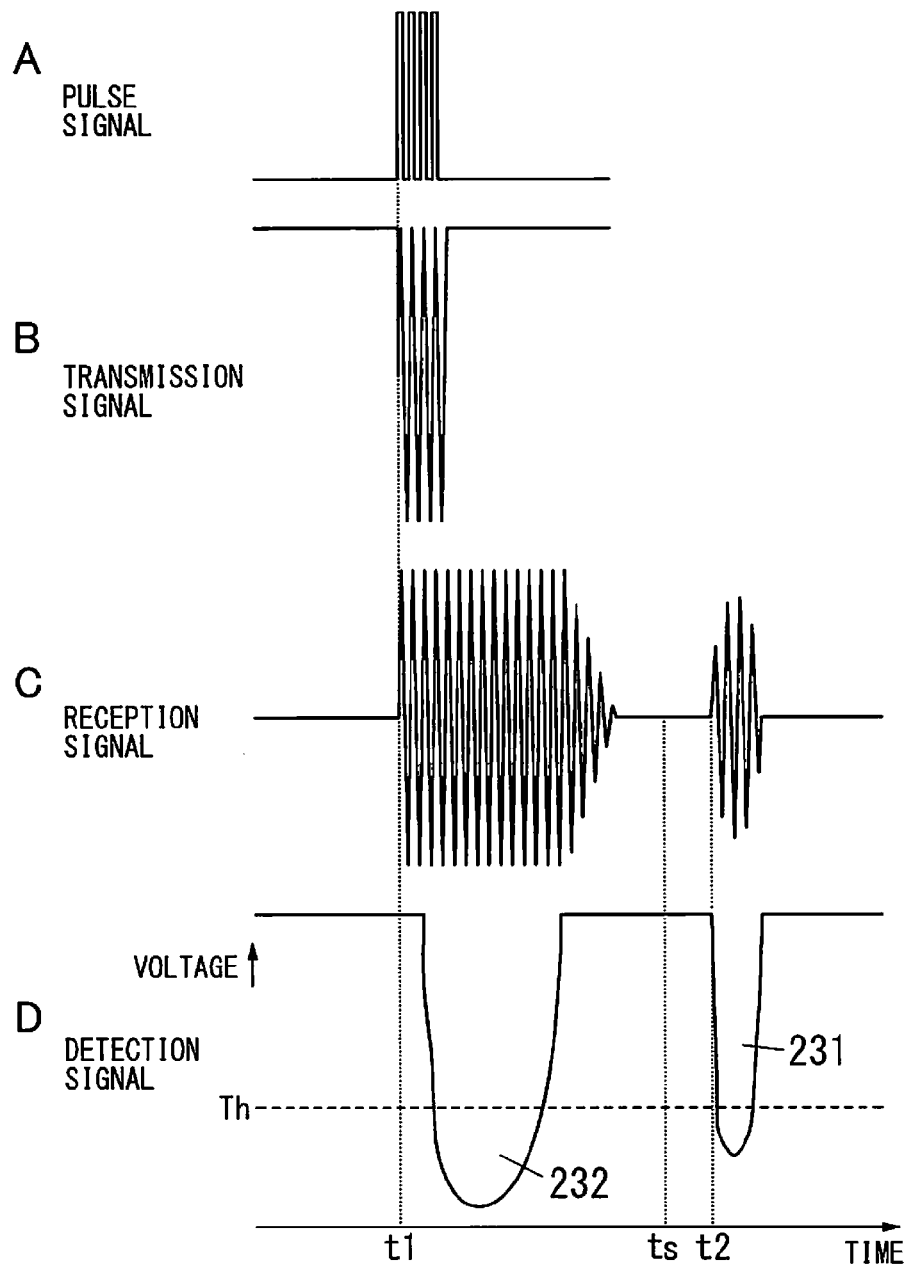

VEHICLE OBSTACLE DETECTION DEVICE

RELATED APPLICATIONS

This application is the U.S. National Phase under 35 U.S.C. §371 of International Application No. PCT/JP2012/079806, filed on Nov. 16, 2012, which in turn claims the benefit of Japanese Application No. 2011-254464, filed on Nov. 21, 2011, the disclosures of which Applications are incorporated by reference herein.

TECHNICAL FIELD

This invention relates to a vehicle obstacle detection device which detects, with sound waves or ultrasonic waves, an obstacle around a vehicle.

BACKGROUND ART

Conventionally, there has been provided a vehicle obstacle detection device which detects, with sound waves or ultrasonic waves, an obstacle around a vehicle (e.g., see WO 2009/119577 A1). The document discloses the vehicle obstacle detection device which detects the obstacle around the vehicle, with a sensor transmitting and receiving the ultrasonic waves, thereby assisting parking of the vehicle. In the vehicle obstacle detection device described in the document, the sensor transmits transmission waves, and receives reflected waves that are reflected by an obstacle, and then the vehicle obstacle detection device detects the obstacle around the vehicle, based on a time period between a timing of when the sensor transmits the transmission waves and a timing of when the sensor receives the reflected waves. The sensor of such a vehicle obstacle detection device generally includes a piezo element.

This kind of vehicle obstacle detection device receives power supply from a battery that is installed in the vehicle. The power supply from the battery is also used for other apparatuses that are installed in the vehicle, and accordingly the voltage fluctuates, depending on use situations of other apparatuses. Here, because the sensor including the piezo element outputs sound waves or ultrasonic waves with a sound pressure depending on the supplied voltage, the output sound pressure is changed together with the fluctuation of the supplied voltage. Therefore, the conventional vehicle obstacle detection device keeps constant the output of the transmission waves by the sensor, using a stabilization power supply circuit that keeps constant the voltage to be supplied to the sensor.

However, an output voltage becomes lower than an input voltage, due to using the stabilization power supply circuit. Accordingly, when using the stabilization power supply circuit to keep constant the voltage to be supplied to the sensor, there is a case where the output sound pressure from the sensor becomes smaller than a desired sound pressure. In this case, there is a problem that a distance at which the vehicle obstacle detection device can detect the obstacle is reduced.

DISCLOSURE OF THE INVENTION

It is an object of the present invention to provide a vehicle obstacle detection device which can relatively increase a distance at which the vehicle obstacle detection device is able to detect an obstacle even when a voltage supplied from a power supply to a sensor fluctuates.

A vehicle obstacle detection device according to one aspect of the present invention includes a sensor and a controller. The sensor is configured to intermittently transmit transmission waves and receive reflected waves that are generated by reflection of the transmission waves. The controller is configured to output a transmission signal for instructing the sensor to transmit the transmission waves. The controller is configured to evaluate, when the sensor receives the reflected waves with amplitude that is a prescribed threshold or more, a time period between a timing of outputting the transmission signal and a timing of reception of the reflected waves by the sensor, to detect presence or absence of an obstacle. The sensor is configured to be driven with a power supply voltage to output the transmission waves. The controller includes a voltage monitoring unit that is configured to detect the power supply voltage. The controller is configured to more reduce the prescribed threshold as the power supply voltage detected by the voltage monitoring unit is lower.

In the vehicle obstacle detection device, preferably, the controller is configured to change the prescribed threshold, in stages, according to the power supply voltage detected by the voltage monitoring unit.

In the vehicle obstacle detection device, preferably, the prescribed threshold includes a first threshold and a second threshold that is more than the first threshold, and the controller is configured to detect, when the power supply voltage is equal to or more than a first reference value and is less than a second reference value, the presence or absence of the obstacle with the first threshold, and the controller is configured to detect, when the power supply voltage is equal to or more than the second reference value and is less than a third reference value, the presence or absence of the obstacle with the second threshold.

In the vehicle obstacle detection device, preferably, the controller is configured not to allow, when the power supply voltage is less than the first reference value or is equal to or more than the third reference value, the sensor to transmit the transmission waves.

According to the aspect of the present invention, it is possible to relatively increase a distance at which the vehicle obstacle detection device is able to detect the obstacle even when a voltage supplied from a power supply to the sensor fluctuates.

BRIEF DESCRIPTION OF THE DRAWINGS

Preferred embodiments of the present invention will now be described in further details. Other features and advantages of the present invention will become better understood with regard to the following detailed description and accompanying drawings where:

FIG. 3 is an explanatory diagram of an operation of the vehicle obstacle detection device according to the embodiment of the present invention;

FIG. 4 is a diagram illustrating a relationship between a power supply voltage value and a threshold in the vehicle obstacle detection device according to the embodiment of the present invention;

BEST MODE FOR CARRYING OUT THE INVENTION

Figure 1:
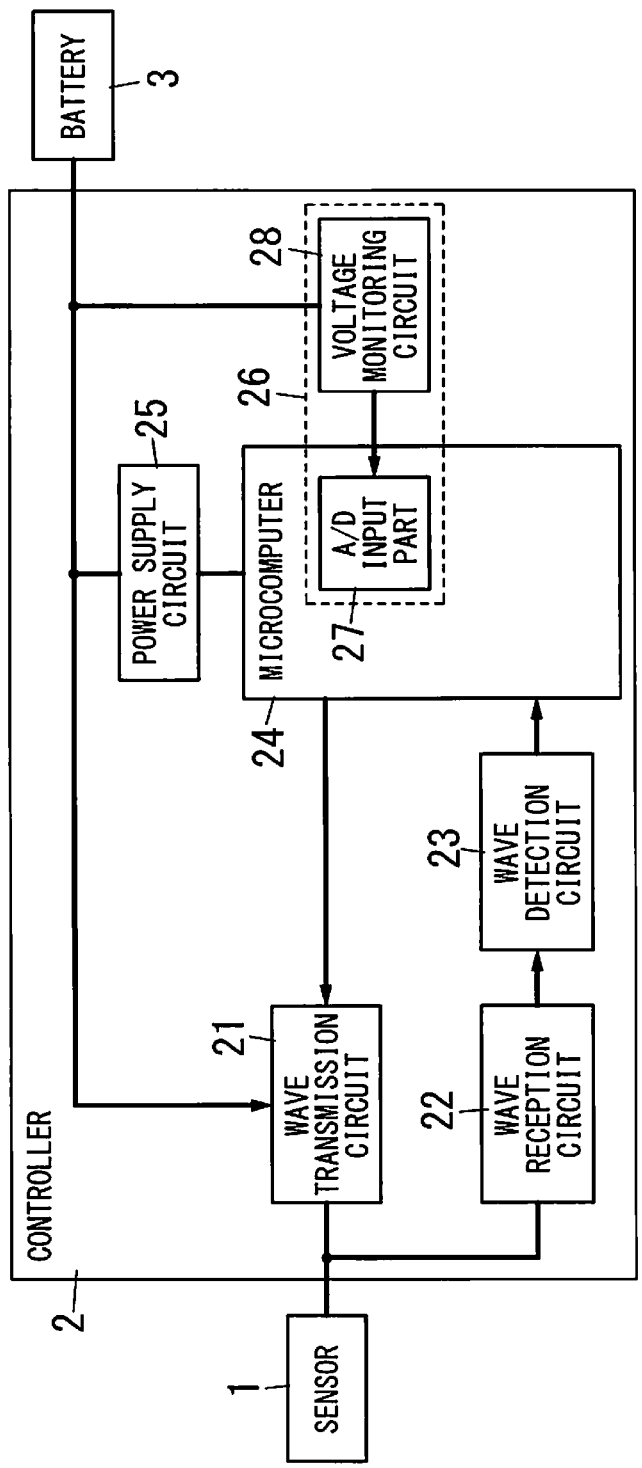
FIG. 1 is a block diagram illustrating a vehicle obstacle detection device according to an embodiment of the present invention.
Figure 2:
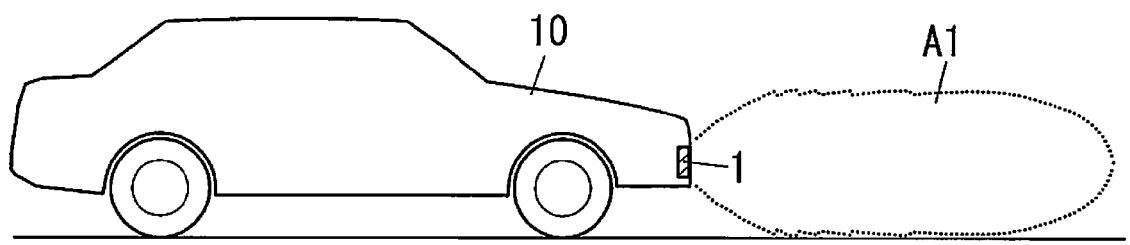
FIG. 2 is a diagram illustrating a relationship between a detection range and a vehicle in which the vehicle obstacle detection device according to the embodiment of the present invention is installed.

A vehicle obstacle detection device of the present embodiment, as shown in FIG. 1, includes a sensor 1 and a controller 2. The sensor 1 includes a piezo element and is configured to transmit and receive ultrasonic waves. The controller 2 is configured to instruct the sensor 1 to transmit transmission waves, and determine presence or absence of an obstacle, with a sensor signal that is output by the sensor 1 due to reception of reflected waves. As shown in FIG. 2, the sensor 1 is installed to at least one of front and back ends of a vehicle 10, and the vehicle obstacle detection device detects an obstacle around the vehicle 10. Hereinafter, as one example, a case will be described, where the sensor 1 is installed in the front side of the vehicle 10, so that a detection range A1 is set in a front direction of the vehicle 10.

As shown in FIG. 1, the controller 2 of the present embodiment includes a microcomputer 24, and is configured as part of an ECU (Electric Control Unit) that performs electronic control for various units in the vehicle 10. The controller 2 receives power supply from an in-vehicle battery 3. The controller 2 includes a wave transmission circuit 21 that is configured to drive the sensor 1 to transmit the transmission waves, in addition to the microcomputer 24. Further, the controller 2 includes a wave reception circuit 22 and a wave detection circuit 23. The wave reception circuit 22 is configured to extract, from the sensor signal, a signal that has a frequency within a predetermined frequency band including a frequency of the transmission wave, as a reception signal. The wave detection circuit 23 is configured to output a detection signal that corresponds to an envelope component of the reception signal. The microcomputer 24 receives power supply stabilized by a power supply circuit 25.

Here, as shown in FIG. 1, only the microcomputer 24 receives the stabilized power supply from the power supply circuit 25, and the wave transmission circuit 21 receives a power supply voltage directly from the battery 3. That is, because the wave transmission circuit 21 receives the power supply voltage that fluctuates depending on use situations of other apparatuses, also amplitude of a transmission signal output from the wave transmission circuit 21 fluctuates depending on the power supply voltage.

Next, a basic operation of the vehicle obstacle detection device will be described. When the vehicle obstacle detection device starts the operation, the microcomputer 24, as shown in A of FIG. 3, intermittently transmits, to the wave transmission circuit 21, a pulse signal that includes rectangular waves having constant periods. A single pulse signal includes several rectangular waves, each of which has the same period as the ultrasonic wave output from the sensor 1. When this pulse signal is input to the wave transmission circuit 21, the wave transmission circuit 21 outputs the transmission signal with the amplitude depending on the power supply voltage received from the battery 3, as shown in B of FIG. 3. The sensor 1 is driven by the transmission signal, and intermittently transmits the ultrasonic waves, each of which has a sound pressure depending on the amplitude of the transmission signal.

On the other hand, the wave reception circuit 22 receives, for a little while from the output of the transmission signal, the transmission signal that turns around from the wave transmission circuit 21 and a signal that is generated due to reverberation of the sensor 1. After that, when the sensor 1 receives the reflected waves, the wave reception circuit 22 receives also a signal by the reflected waves. Therefore, the wave reception circuit 22 outputs the reception signal as shown in C of FIG. 3. Further, the wave detection circuit 23, as shown in D of FIG. 3, outputs the detection signal that has a voltage value corresponding to the envelope component of the reception signal. When a signal level of the detection signal is a prescribed threshold Th or more, the microcomputer 24 evaluates a time period between a timing of outputting the pulse signal and a timing of detecting the detection signal, to detect presence or absence of the obstacle.

Here, it is assumed that the microcomputer 24 outputs the pulse signal at a time t1 shown in FIG. 3 and the detection signal is obtained at a time t2 shown in FIG. 3. In the example of the drawing, a component 232 including reverberation is also obtained as the detection signal, in addition to the detection signal at the time t2 (a component 231 by the reflected wave). Here, in order to remove this component 232 including the reverberation, the microcomputer 24 is out of a state of determining the presence or absence of the obstacle during a time period between the time t1 at which the pulse signal is output and a prescribed time ts, as a non-detection period. Then, the microcomputer 24 defines a predetermined time period after the prescribed time ts, as a detection period for determining the presence or absence of the obstacle, and determines the presence or absence of the obstacle, based on the detection signal during the detection period. The above-mentioned detection range A1 is defined during this detection period.

As described above, the wave transmission circuit 21 is driven with the power supply voltage from the battery 3, and accordingly, the amplitude of the transmission signal output from the wave transmission circuit 21 is also changed with the fluctuation of the power supply voltage. That is, as the power supply voltage is lower, the amplitude of the transmission signal output from the wave transmission circuit 21 is reduced and therefore the sound pressure of the transmission wave is also reduced.

In order to adapt to such a change of the sound pressure, the controller 2 of the present embodiment further includes a voltage monitoring unit 26 that detects the power supply voltage, and is configured to change the above-mentioned threshold Th, depending on the power supply voltage detected by the voltage monitoring unit 26. The voltage monitoring unit 26 is configured by an A/D input part 27 that is included in the microcomputer 24 and a voltage monitoring circuit 28 that reduces the power supply voltage to a voltage to be applied to the A/D input part 27. The voltage monitoring circuit 28 includes a voltage dividing circuit for example, and applies a voltage proportional to the power supply voltage to the A/D input part 27. The A/D input part 27 converts, to a digital value, the voltage applied from the voltage monitoring circuit 28. Accordingly, the microcomputer 24 obtains a power supply voltage value Vs through the digital value from the voltage monitoring unit 26.

Figure 5:
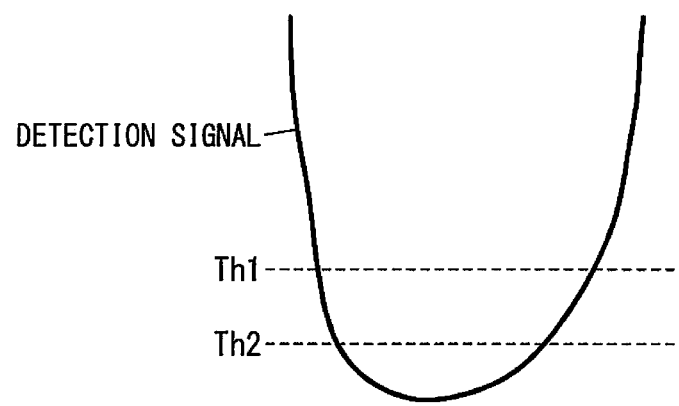
FIG. 5 is an explanatory diagrams of an operation of the vehicle obstacle detection device according to the embodiment of the present invention.

The microcomputer 24 is configured to change the threshold Th, in stages, according to the power supply voltage value Vs. In the present embodiment, the threshold includes a first threshold Th1 and a second threshold Th2, as two stages. That is, the microcomputer 24 selects, as the threshold Th, any one of the first and second thresholds Th1 and Th2, according to the power supply voltage value Vs. The first threshold Th1 is set to be less than the second threshold Th2 (Th1<Th2) (see FIG. 5). In FIG. 5, a direction of a magnitude of a signal level faces a downward direction, and accordingly, the wave form more extends in the downward direction as a voltage value (absolute value) of the detection signal is more increased, similarly to D of FIG. 3.

The threshold selected from the first and second thresholds Th1 and Th2 is determined by comparing the power supply voltage value Vs with three stages of reference values (first to third reference values V1, V2 and V3). That is, as shown in FIG. 4, the microcomputer 24 selects, when the power supply voltage value Vs is equal to or more than the first reference value V1 and is less than the second reference value V2 (V1<=Vs<V2), the first threshold Th1, as the threshold Th. The microcomputer 24 selects, when the power supply voltage value Vs is equal to or more than the second reference value V2 and is less than the third reference value V3 (V2<=Vs<V3), the second threshold Th2, as the threshold Th. The microcomputer 24 sets, when the power supply voltage value Vs is less than the first reference value V1 (Vs<V1) or is equal to or more than the third reference value V3 (Vs>=V3), no threshold Th, and accordingly, the vehicle obstacle detection device is out of the operation of detecting the obstacle.

In this way, it is possible to drive the wave transmission circuit 21 with the power supply voltage by changing the threshold Th, in stages, according to the power supply voltage value Vs, to detect the presence or absence of the obstacle, and as a result, it is possible to increase the sound pressure of the transmission wave. Therefore, the vehicle obstacle detection device can detect the farther obstacle, compared with a conventional vehicle obstacle detection device.

Figure 6:
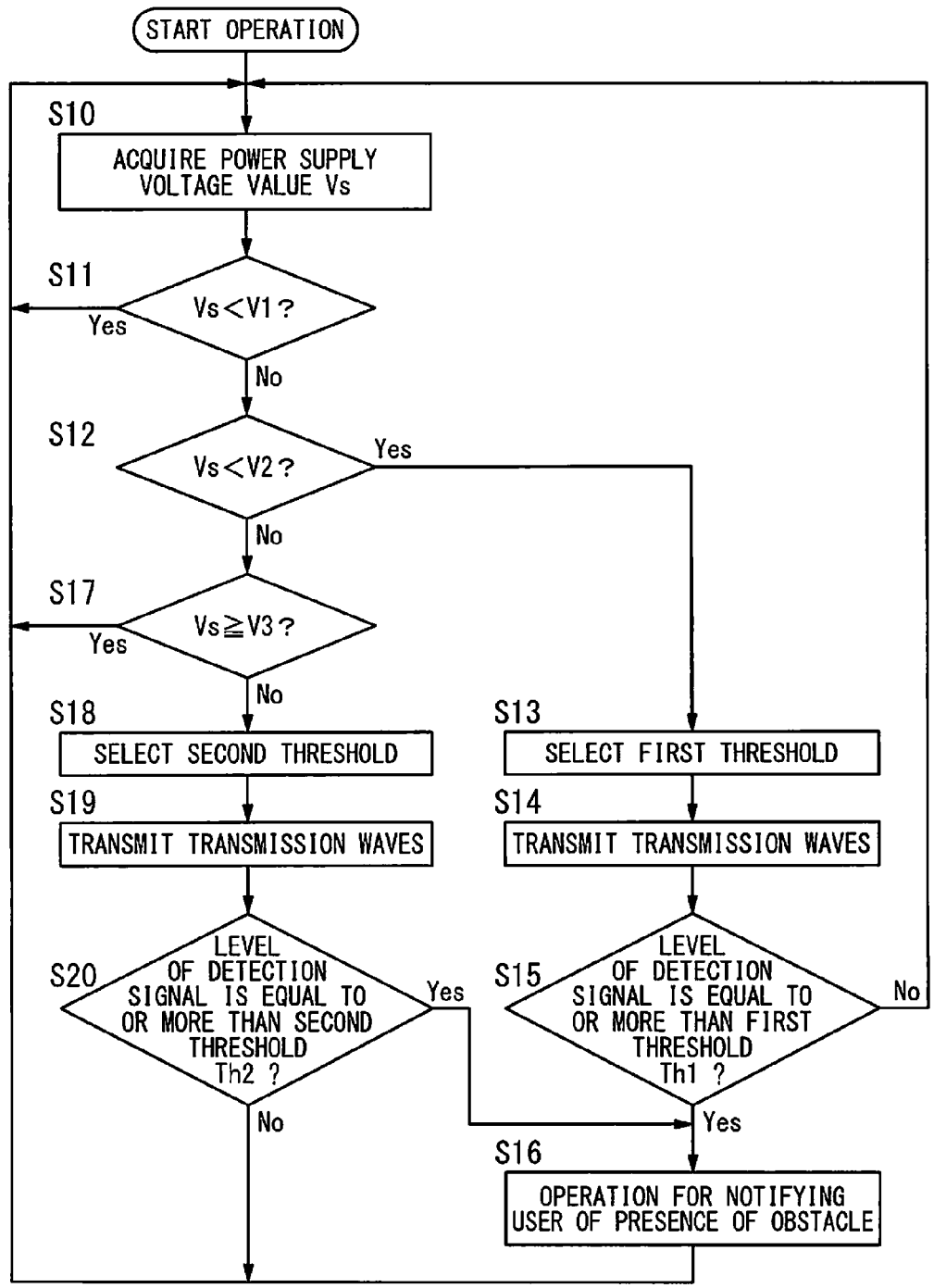
FIG. 6 is a flowchart of an operation of the vehicle obstacle detection device according to the embodiment of the present invention.

The operation of the above microcomputer 24 is summarized and shown in FIG. 6.

When the vehicle obstacle detection device starts the operation, the microcomputer 24 acquires a power supply voltage value Vs through the A/D input part 27 (S10). The microcomputer 24 compares the power supply voltage value Vs with the first to third reference values V1, V2 and V3 (S11, S12 and S17).

When the power supply voltage value Vs is less than the first reference value V1 (S11: Yes) or is equal to or more than the third reference value V3 (S17: Yes), the microcomputer 24 acquires a new power supply voltage value Vs without outputting the pulse signal (S10). That is, because the microcomputer 24 outputs no pulse signal to the wave transmission circuit 21, the vehicle obstacle detection device is out of the state of determining presence or absence of the obstacle. Therefore, in this case, it is preferred that the microcomputer separately performs an error processing to inform a user.

On the other hand, when the power supply voltage value Vs is equal to or more than the first reference value V1 and is less than the second reference value V2 (S12: Yes), the microcomputer 24 selects the first threshold Th1, as the threshold Th (S13). After that, the microcomputer 24 outputs the pulse signal to make the sensor 1 transmit the transmission waves (S14). When the signal level of the detection signal depending on the reflected waves is equal to or more than the first threshold Th1 (S15: Yes), the microcomputer 24 determines that the obstacle is present, and performs notification operation (S16). The microcomputer 24 may perform auditory notification operation with a buzzer or the like, or perform visual notification operation with a lamp. Then, the microcomputer 24 acquires a new power supply voltage value Vs (S10), and repeats the above-mentioned operation.

On the other hand, when the power supply voltage value Vs is equal to or more than the second reference value V2 and is less than the third reference value V3 (S17: No), the microcomputer 24 selects the second threshold Th2, as the threshold Th (S18). After that, the microcomputer 24 outputs the pulse signal to the wave transmission circuit 21 to make the sensor 1 transmit the transmission waves (S19). When the signal level of the detection signal depending on the reflected waves is equal to or more than the second threshold Th2 (S20: Yes), the microcomputer 24 determines that the obstacle is present, and performs the notification operation (S16). Here, time intervals of acquiring the power supply voltage value Vs are set to be equal to time intervals of outputting the pulse signal.

In the present embodiment, the vehicle obstacle detection device includes the sensor 1 that transmits and receives the ultrasonic waves, but may include a sensor that transmits and receives sound waves in an audible range instead of the sensor 1.

Although the present invention has been described with reference to certain preferred embodiments, numerous modifications and variations can be made by those skilled in the art without departing from the true spirit and scope of this invention, namely claims.

The invention claimed is:

1. A vehicle obstacle detection device, comprising:
   a sensor configured to intermittently transmit transmission waves and receive reflected waves that are generated by reflection of the transmission waves; and
   a controller configured to output a transmission signal for instructing the sensor to transmit the transmission waves,
   the controller being configured to evaluate, when the sensor receives the reflected waves with amplitude that is a prescribed threshold or more, a time period between a timing of outputting the transmission signal and a timing of reception of the reflected waves by the sensor, to detect presence or absence of an obstacle,
   wherein the sensor is configured to be driven with a power supply voltage to output the transmission waves, and
   wherein the controller comprises a voltage monitoring unit that is configured to detect the power supply voltage, the controller being configured to more reduce the prescribed threshold as the power supply voltage detected by the voltage monitoring unit is lower.

2. The vehicle obstacle detection device according to claim 1,
   wherein the controller is configured to change the prescribed threshold, in stages, according to the power supply voltage detected by the voltage monitoring unit.

3. The vehicle obstacle detection device according to claim 2,
   wherein the prescribed threshold includes a first threshold and a second threshold that is more than the first threshold, and
   wherein the controller is configured to detect, when the power supply voltage is equal to or more than a first reference value and is less than a second reference value, the presence or absence of the obstacle with the first threshold,
   the controller being configured to detect, when the power supply voltage is equal to or more than the second reference value and is less than a third reference value, the presence or absence of the obstacle with the second threshold.

4. The vehicle obstacle detection device according to claim 3,
   wherein the controller is configured not to allow, when the power supply voltage is less than the first reference value or is equal to or more than the third reference value, the sensor to transmit the transmission waves.

* * * * *